United States Patent [19]

Nannen

[11] Patent Number: 4,704,848
[45] Date of Patent: Nov. 10, 1987

[54] ROTARY LAWN MOWER

[76] Inventor: William G. Nannen, P.O. Box 116, Smethport, Pa. 16749

[21] Appl. No.: 750,788

[22] Filed: Jul. 1, 1985

[51] Int. Cl.$^4$ ................. A01D 34/67; A01D 34/74
[52] U.S. Cl. ........................... 56/17.2; 56/295
[58] Field of Search ............. 56/17.2, 12.8, 15.4, 56/15.3, 16.9, 13.4, 295

[56] References Cited

U.S. PATENT DOCUMENTS

| | | | |
|---|---|---|---|
| 1,992,494 | 2/1935 | Lundin | 56/17.2 |
| 2,509,936 | 5/1950 | Packwood | 56/16.7 |
| 2,520,488 | 8/1950 | Batchelder | 56/16.7 |
| 2,953,887 | 9/1960 | Boesch, Jr. et al. | 56/13.4 |
| 3,034,275 | 5/1962 | Happe et al. | 56/17.5 |
| 3,141,283 | 7/1964 | Swindler | 56/17.2 |
| 3,540,198 | 11/1970 | Heth et al. | 56/295 |
| 3,921,372 | 11/1975 | Arnblock | 56/12.8 |
| 4,084,395 | 4/1978 | Nannen | 56/17.2 |
| 4,183,196 | 1/1980 | Oosterling et al. | 56/295 |

Primary Examiner—Paul J. Hirsch
Attorney, Agent, or Firm—Warren D. Flackbert

[57] ABSTRACT

A rotary lawn mower characterized by an elongated framework presenting a rear power portion and rotor-cutter blade assemblies rotatable around wheel supported shafts connecting to said framework at the front thereof and featuring a cutter blade vertical adjustment operable in unison by a chain-sprocket arrangement for achieving uniform cutting. Vertical displacement of the rotor-cutter blade assemblies is accomplished by rotation of threaded members secured to decking overlying the rotor-cutter blade assemblies and vertically movable therewith. A power source serves to drive the wheels for the power portion of the mower and, as well, the front cutter portion, i.e. the rotor-cutter blade assemblies.

8 Claims, 5 Drawing Figures

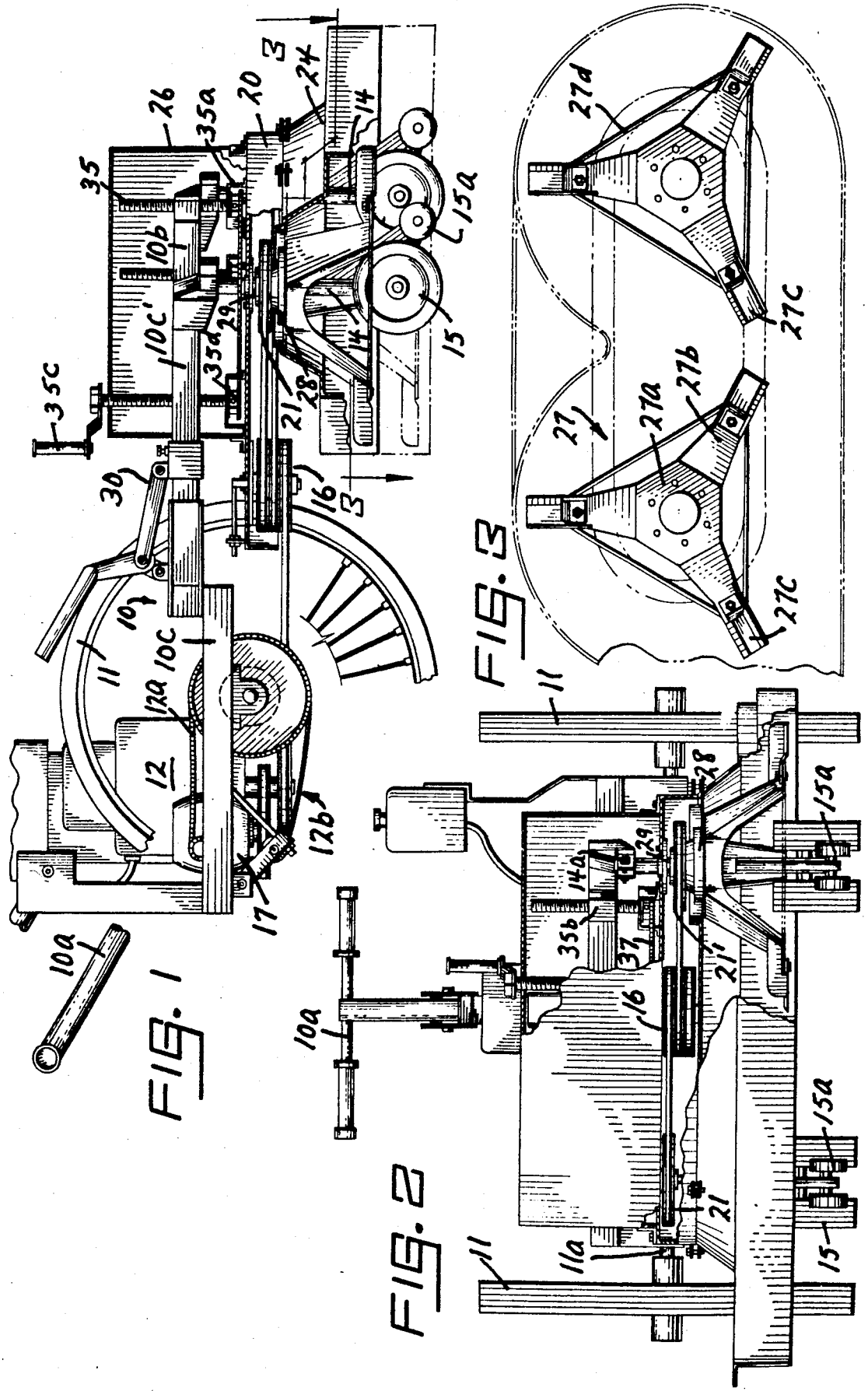

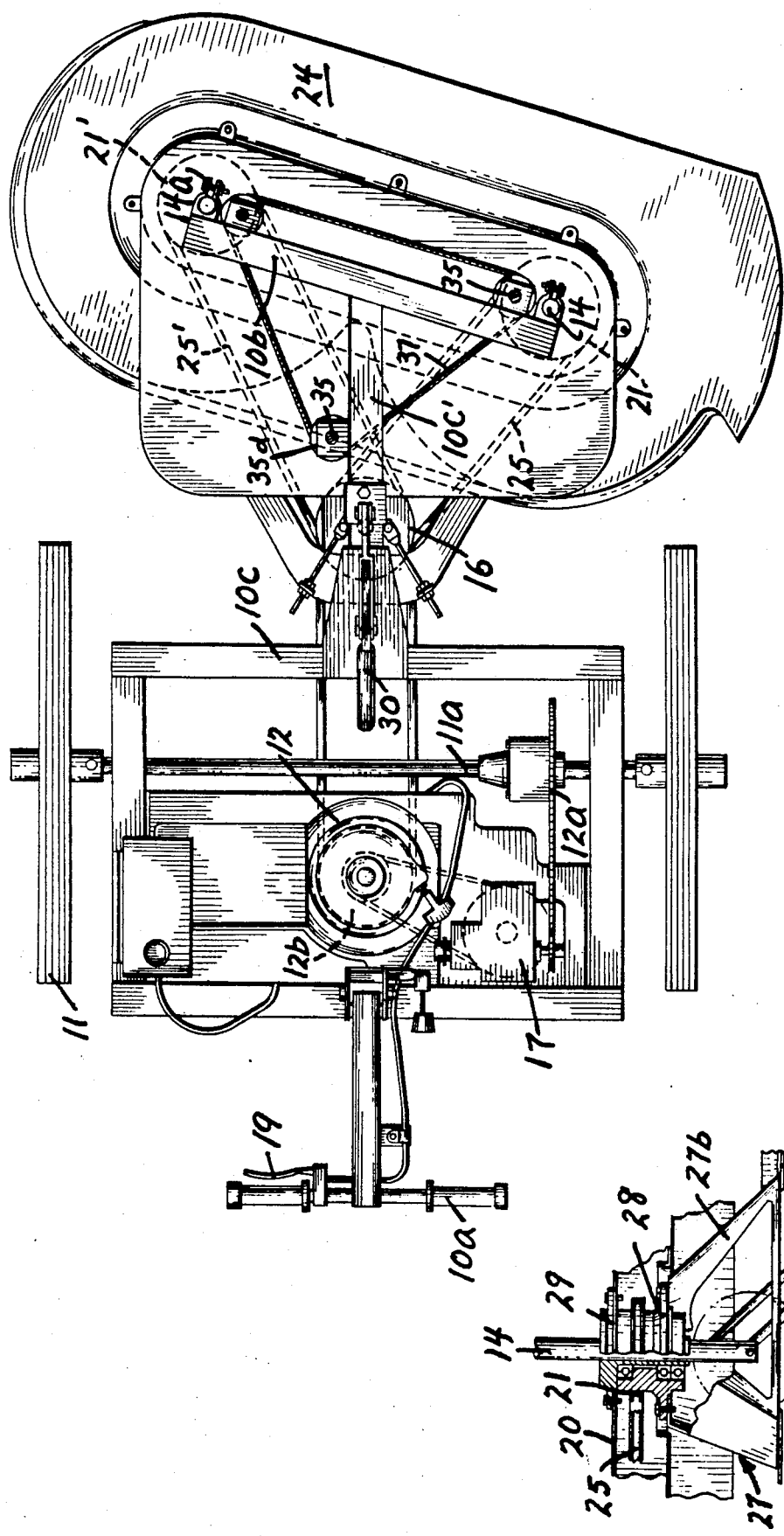

ROTARY LAWN MOWER

As is known, the popularity and/or usage of rotary type lawn mowers is widespread, where various types and sizes of such are commercially available for a variety of cutting needs. Problems encountered with existing rotary mowers, however, include, by way of example, the presence of unsightly streaks after cutting due to wheel compaction of the grass; difficulties with close trimming, as around bushes and trees; the unhandiness involved to readily achieve the desired cutting height (generally through wheel adjustment); and, blade maintenance, including the sharpening of the large expanse of a usual cutting edge.

The present invention overcomes the preceding by presenting a rotary mower which, among other features, cuts the grass before any wheel compaction; permits close trimming because no large wheels/extensions mount on the front of the mower or cutter deck; cuts the grass evenly; provides a single cutting height adjustment control affording uniform cutting throughout a preselected range, i.e. to a desired height not limited to specific wheel settings; allows variations in cutting height while the mower is running; affords lower ground pressure, with effective maneuvering, stability and traction; minimizes lawn scalping; permits ease in sharpening and/or replacement of the cutter blades (which are relatively short in length); and, is readily adaptable to push, self-propelled or riding mowers with side or rear discharge.

Basically, the principal features of the invention may be generalized as (1) the shape and/or configuration of the rotors which carry the cutter blades, where the number of rotors employed may vary with cutting requirements, and (2) the particular height adjustment arrangement. Moreover, the instant rotary lawn mower presents a simplified design achieved with the use of fewer parts, ease in manufacturing and, as well, common tooling procedures.

In any event, a better understanding of the present invention will become more apparent from the following description, taken in conjunction with the accompanying drawings, wherein FIG. 1 is a view in side elevation, partly fragmentary, showing a rotary lawn mower in accordance with the teachings of the present invention;

FIG. 2 is a view in front elevation of the invention, looking from right to left in FIG. 1;

FIG. 3 is a view in section, taken at line 3—3 on FIG. 1 and looking in the direction of the arrows, detailing the rotor arrangement;

FIG. 4 is a top plan view of the instant lawn mower, i.e. looking downwardly onto FIG. 1; and, FIG. 5 is a view in side elevation detailing a decking-rotor assembly, in this instance illustrating the alternative usage of a sled or anti-gouging pad instead of the wheel(s) of FIGS. 1 and 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modification in the illustrated device, and such further applications of the principles of the invention as illustrated therein being contemplated as would normally occur to one skilled in the art to which the invention relates.

Referring now to the figures, and particularly FIGS. 1, 2 and 4, the rotary lawn mower of the invention is represented by a framework 10 steerable by a pivotal handle 10a. The framework 10 includes a laterally extending support bar member 10b at the end of a two-part spine 10c—10c' and mounts a power source 12, such as a gasoline engine.

Large diameter wheels 11, on axle 11a, support the rear of framework 10, where shafts 14, secured to bar member 10b, as at clamps 14a, and including wheels 15 at the lower ends thereof, serve to support the front of the framework 10. The aforesaid arrangement presents a unitary acting structure upon assembly, representing, basically, primary support for the power portion.

In this connection, wheels 11 are driven by a chain 12a operatively responsive to the power source or engine 12, where a double pulley 12b on the latter serves a two-fold function, to-wit, for rotor-blade pulley 16 driving and for transmission 17 powering to chain 12a (see FIGS. 1 and 4). In other words, upon actuation of a clutch (not shown) by movement of lever 19 on handle 10a, wheels 11 rotate to move the mower and, at the same time, rotor-blade pulley 16 rotates (the latter to be more fully described herebelow).

Extending forwardly from the wheels 11 and suspended for independent movement on the framework 10 is a cutter portion represented by decking including an upper deck 20 and a lower or cutter deck 24, where a cover 26 (removed in FIG. 4) overlies the upper deck 20. In order to separate spline 10c—10c' of the framework 10, i.e. the cutter (or mower) portion from the power portion, a hand-operated disconnect mechanism 30 is provided.

In any event, the lower ends of each of the shafts 14 typically axle mount the wheels 15, where the latter may be fixed in direction or pivotal. Rotors 27, vertically movable together with upper deck 20, cutter deck 24 and cover 26 on shafts 14, are each rotatable through rotation of rotor pulleys 21—21' responsive to belts 25—25' and rotor-blade pulley 16 (see FIGS. 2 and 4). As particularly evident in FIG. 5, rotor pulleys 21—21' are each positioned on a hub 28 to which a rotor 27 is fixedly secured, as by bolting, and which rotates around shaft 14 on a slidable sleeve 29 fixedly secured, again as by bolting, to the bottom of the top surface of upper deck 20.

Each rotor 27 is importantly defined by a central portion 27a and downwardly and outwardly extending arms or spokes 27b, typically and approximately at a 45° angle or range to vertical, which receive, at the free end thereof, a cutter blade 27c (see FIGS. 1, 2 and 3). Moreover, an auxiliary wheel 15a (or an alternative sled or anti-gouging pad 15a'—see FIG. 5) is provided for use in conjunction with wheels 15, serving to minimize the "dip ratio," i.e. the amount the front tip of the cutting blade 27c drops when the wheels 15 drop into a depression in the ground during cutting. The assembly is completed by braces 27d which extend between adjacent arms or spokes 27b.

It should be understood that while three arms or spokes 27b are illustrated, any number of such may be employed. Additionally, the inner surface of each spoke 27b is smooth so as to present self-cleaning of grass cuttings and/or reduction of grass cuttings retention, where the sides of each taper inwardly and downwardly, i.e. toward cutting blade 27c, for strength and minimum mass at the distal point.

Each cutting blade 27c presents a cutting edge offset below spoke 27b and includes a raised or upturned portion behind the cutting edge to create a fan effect for lifting and expelling grass, as well as for reinforcing/stiffening purposes. Moreover, as each cutting blade 27c is relatively short, ready removal for sharpening and/or replacement can be accomplished in contrast to the typical elongated cutting edge of the blades found on standard rotary lawn mowers.

As stated, the invention also presents effective uniform and simultaneous vertical adjustment of the rotors 27 (and cutter blades 27c). As particularly evident in FIG. 1, upstanding threaded shafts 35 are secured, at bracket portions 35a, to the top surface of upper deck 20, where each threaded shaft 35 extends through a locating member 35b secured to either the support bar member 10b or the spine 10c' of framework 10.

A handle 35c is secured to one of the threaded shafts 35 (above cover 26), serving to accomplish vertical movement of each rotor 27, along shaft 14 and without any danger of unwanted binding or rotation, by reason of movement of the decking, i.e. upper deck 20 and assembled cutter deck 24 (from the full line to the phantom line positions of FIG. 1, and conversely). The aforesaid vertical movement of the rotors 27 is accomplished in unison, being achieved through a chain 37 operable by a sprocket 35d disposed at the lower end of each threaded shaft 35 (see FIG. 4). In other words, the rotors 27, and associated cutter blades 27c are movable throughout a range of positions and not into selected wheel settings as in the usual instance of a presently available rotary power mower.

It should be evident, therefore that the stated principal objectives of the invention are readily and effectively achieved, to-wit, the shape/configuration of the rotor-cutter blade assemblies, with associated support wheel and auxiliary support wheel (or anti-gouging pad), afford operational advantages, including the ready replacement of cutter blades and an improvement in "dip ratio." Additionally, with the height adjustment effected by simultaneous action of all rotors, together with the overlying decking, i.e. the upper deck and the cutter deck, the invention affords a particular advantage in the instance where the mower unit is defined by a horizontally spaced apart power portion and cutter portion.

The rotary lawn mower described hereabove is susceptible to various changes within the spirit of the invention, including, for example, proportioning; the particular manner of supporting the shafts and threaded shafts; the integration of the hub and rotor (to eliminate separate attachment); the specific powering arrangement employed; the position and/or location of the shafts along the bar member; and, the like. Thus, the preceding should be considered illustrative and not as limiting the scope of the following claims:

I claim:

1. A rotary lawn mower comprising an elongated framework including a laterally extending forward support member, wheels supporting the rear of said framework, other wheels mounted on non-rotating shafts selectively secured to said laterally extending forward support member, the rear of said framework representing a power portion mounting a power source and the forward portion of said framework representing a cutter portion, said cutter portion defined by blade carrying rotors rotatable on and slidable along said and decking overlying said blade carrying rotors and movable vertically therewith, a vertical adjustment arrangement for said blade carrying rotors including rotatable threaded shafts connecting said forward portion of said framework and secured to said decking, chain-sprocket means interconnecting said threaded shafts serving selective simultaneous rotation thereof to achieve vertical displacement of said decking and said blade carrying rotors, and means interconnecting said power source powering said wheels and said blade carrying rotors, where an anti-gouging member mounted inwardly of the cutting path presented by the blades of said blade carrying rotors combining with each of said other wheels serves to selectively minimize the blade drop ratio of said blade carrying rotors, and where said rotatable blade carrying rotors are each defined by an arrangement including a body member having a central region from which three non-opposing spaced-apart single spokes extend downwardly and outwardly, terminating at free lower ends, and an outwardly extending cutter blade secured to each of the latter, and where said three non-opposing spaced-apart single spokes, together with a member interconnecting each of said free lower ends, present a generally triangular rotor configuration on all sides and at the bottom, serving stiffness and minimal wind resistance.

2. The rotary lawn mower of claim 1 where said anti-gouging member is a wheel.

3. The rotary lawn mower of claim 1 where said anti-gouging member is a pad.

4. A rotor-cutter blade arrangement for a lawn mower comprising a body member including a central region from which three non-opposing spaced-apart single spokes extend downwardly and outwardly, terminating at free lower ends, and an outwardly extending cutter blade secured to each of the latter, where said three non-opposing spaced-apart single spokes, together with a member interconnecting each of said free lower ends, present a generally trangular rotor configuration on all sides and at the bottom, serving stiffness and minimal wind resistance.

5. The rotor-cutter blade arrangement of claim 4 where said single spokes are each at a 45° angle with respect to horizontal.

6. The rotor-cutter blade arrangement of claim 4 where the inner surface of each of said single spokes is smooth, serving self-cleaning purposes.

7. The rotor-cutter blade arrangement of claim 4 where said cutter blades each include an upturned lagging edge.

8. A rotary lawn mower comprising an elongated framework a laterally extending forward support member, wheels supporting the rear of said framework, other wheels mounted on non-rotating shafts selectively secured to said laterally extending forward support member, the rear of said framework representing a power portion mounting a power source and the forward portion of said framework representing a cutter portion, said cutter portion defined by blade carrying rotors rotatable on and slidable along said non-rotating shafts and decking overlying said blade carrying rotors and movable vertically therewith, a vertical adjustment arrangement for said blade carrying rotors including rotatable threaded shafts connecting said forward portion of said framework and secured to said decking, chain-sprocket means interconnecting said threaded shafts serving selective simultaneous rotation thereof to achieve vertical displacement of said decking and said blade carrying rotors, and menas interconnecting said power source powering said wheels and said blade carrying rotors, and where an anti-gouging member mounted inwardly of the cutting path presented by the blades of said blade carrying rotors combining with each of said other wheels serves to selectively minimize the blade drop ratio of said blade carrying rotors.

* * * * *

UNITED STATES PATENT AND TRADEMARK OFFICE
CERTIFICATE OF CORRECTION

PATENT NO. : 4,704,848

DATED : November 10, 1987

INVENTOR(S) : William G. Nannen

It is certified that error appears in the above-identified patent and that said Letters Patent is hereby corrected as shown below:

Column 4, Claim 1, line 1, after "along said" insert -- non-rotating shafts--,

Column 5, line 2, "menas" should read -- means --.

Signed and Sealed this

Ninth Day of August, 1988

Attest:

DONALD J. QUIGG

*Attesting Officer*    *Commissioner of Patents and Trademarks*